(12) United States Patent
Chabin et al.

(10) Patent No.: US 11,331,861 B2
(45) Date of Patent: May 17, 2022

(54) OPTICAL ELEMENT, ASSEMBLY COMPRISING SUCH AN OPTICAL ELEMENT AND METHOD OF MANUFACTURING AN OPTICAL ELEMENT

(71) Applicant: Essilor International, Charenton-le-Pont (FR)

(72) Inventors: Laurent Chabin, Charenton-le-Pont (FR); Xavier Bultez, Charenton-le-Pont (FR); Guy Schott, Charenton-le-Pont (FR)

(73) Assignee: Essilor International, Charenton-le-Pont (FR)

( * ) Notice: Subject to any disclaimer, the term of this patent is extended or adjusted under 35 U.S.C. 154(b) by 99 days.

(21) Appl. No.: 16/621,841

(22) PCT Filed: Jun. 19, 2018

(86) PCT No.: PCT/EP2018/066298
§ 371 (c)(1),
(2) Date: Dec. 12, 2019

(87) PCT Pub. No.: WO2018/234326
PCT Pub. Date: Dec. 27, 2018

(65) Prior Publication Data
US 2020/0156324 A1 May 21, 2020

(30) Foreign Application Priority Data

Jun. 19, 2017 (EP) .................................... 17305750
Jan. 31, 2018 (EP) .................................... 18305102

(51) Int. Cl.
*B29C 64/40* (2017.01)
*B33Y 10/00* (2015.01)
(Continued)

(52) U.S. Cl.
CPC ........ *B29C 64/40* (2017.08); *B29D 11/00432* (2013.01); *B33Y 10/00* (2014.12);
(Continued)

(58) Field of Classification Search
CPC ......... B29C 64/40; B33Y 10/00; B33Y 80/00; B29L 2011/00
See application file for complete search history.

(56) References Cited

U.S. PATENT DOCUMENTS 6,383,061 B1   5/2002  Mandler
7,125,117 B2  10/2006  Chansavoir et al.
(Continued)

FOREIGN PATENT DOCUMENTS

DE     10332673 A1   2/2005
EP      1656248 A1   5/2006
(Continued)

OTHER PUBLICATIONS

Notification of the First Office Action issued in CN Patent Application No. 201880040841.1 dated Apr. 8, 2021 with English translation provided.

(Continued)

*Primary Examiner* — Larry W Thrower
(74) *Attorney, Agent, or Firm* — Nixon & Vanderhye

(57) ABSTRACT

An optical element includes an optical lens produced by an additive manufacturing method and a holder formed at least in part with the optical lens by the additive manufacturing method. The holder is adapted for cooperation with a manufacturing machine to thereby position the optical lens at a predetermined position in the manufacturing machine. A corresponding assembly and a method of manufacturing an optical element are also described.

17 Claims, 3 Drawing Sheets

(51) Int. Cl.
*B33Y 80/00* (2015.01)
*B29D 11/00* (2006.01)
*G02C 7/02* (2006.01)
*B29L 11/00* (2006.01)
*B33Y 30/00* (2015.01)

(52) U.S. Cl.
CPC .............. *B33Y 80/00* (2014.12); *G02C 7/022* (2013.01); *B29L 2011/0016* (2013.01); *B33Y 30/00* (2014.12)

(56) References Cited

U.S. PATENT DOCUMENTS

| | | |
|---|---|---|
| 2004/0002293 A1 | 1/2004 | Green |
| 2010/0068016 A1 | 3/2010 | Marian |
| 2012/0113439 A1 | 5/2012 | Ederer |
| 2015/0061166 A1 | 3/2015 | Van De Vrie et al. |
| 2015/0253585 A1 | 9/2015 | Anatole et al. |
| 2016/0114542 A1 | 4/2016 | Quere et al. |

FOREIGN PATENT DOCUMENTS

| | | |
|---|---|---|
| JP | 2003-104478 A | 4/2003 |
| JP | 2009-083326 A | 4/2009 |
| JP | 2016-525967 A | 9/2016 |
| WO | 2005/018919 A1 | 3/2005 |
| WO | 2009/041707 A2 | 4/2009 |
| WO | 2016/108084 A1 | 7/2016 |

OTHER PUBLICATIONS

International Search Report, dated Aug. 17, 2018, from corresponding PCT application No. PCT/EP2018/066298.
Written Opinion, dated Aug. 17, 2018, from corresponding PCT application No. PCT/EP2018/066298.
Office Action issued in Japanese Patent Application No. 2019-570113 dated Feb. 14, 2022.

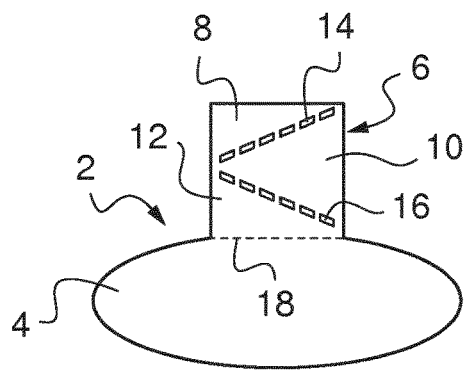
Fig.1
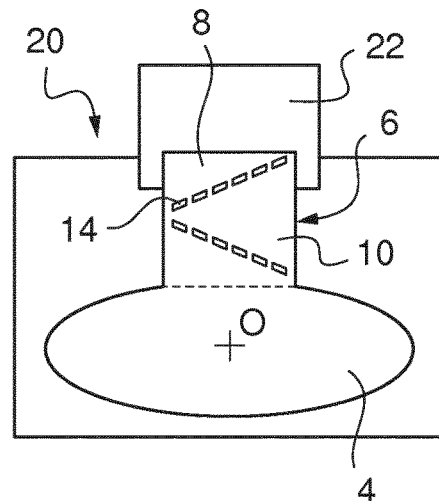
Fig.2
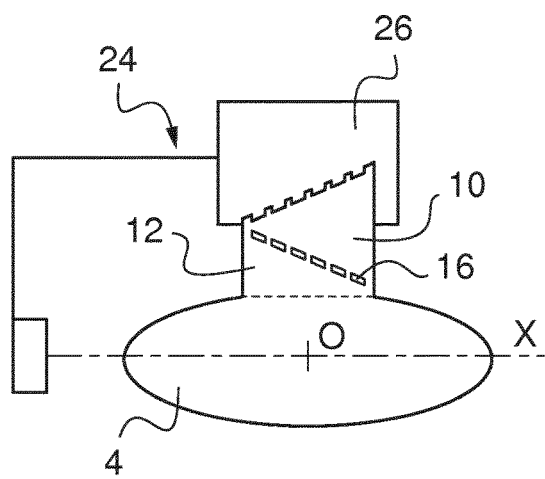
Fig.3
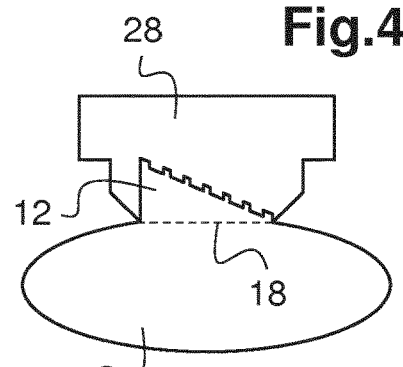
Fig.4
Fig.5
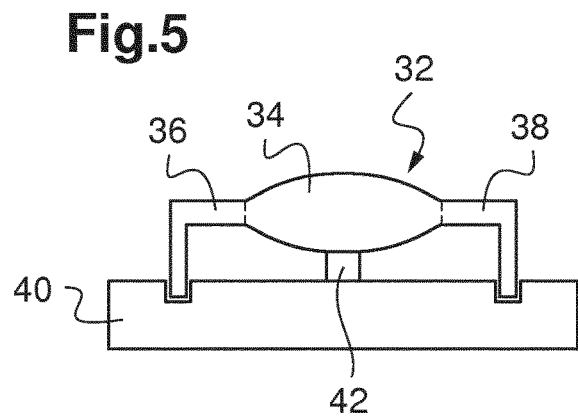

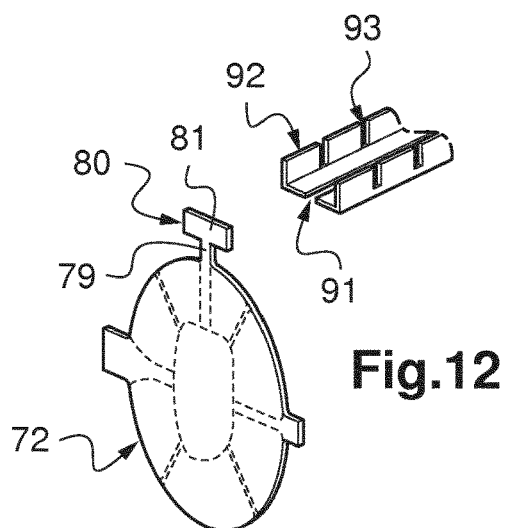
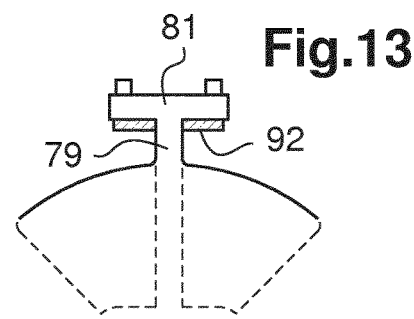
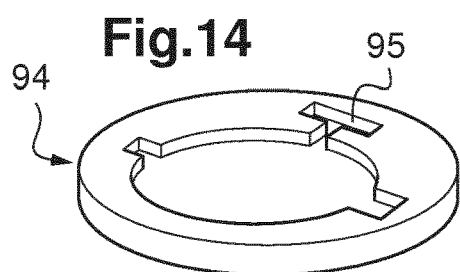
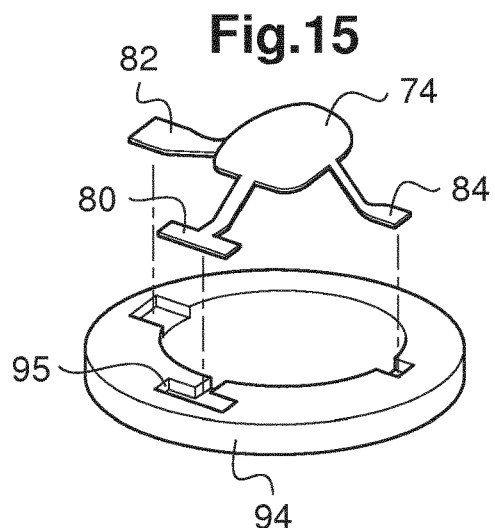
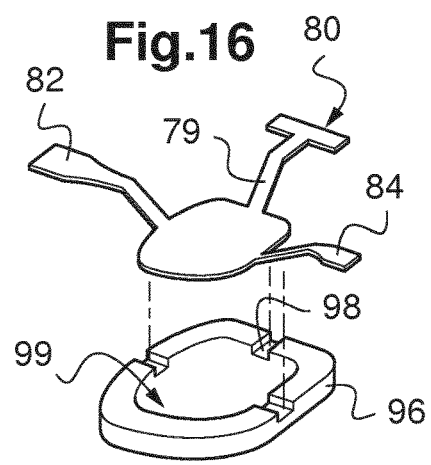
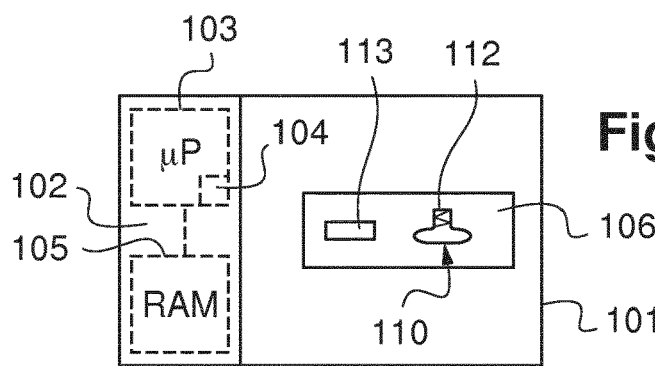

OPTICAL ELEMENT, ASSEMBLY COMPRISING SUCH AN OPTICAL ELEMENT AND METHOD OF MANUFACTURING AN OPTICAL ELEMENT

TECHNICAL FIELD OF THE INVENTION

The invention relates to the area of optical articles.

More precisely the invention relates to an optical element, to an assembly comprising such an optical element and to a method of manufacturing an optical element.

BACKGROUND INFORMATION AND PRIOR ART

The manufacturing of optical lenses, in particular of ophthalmic lenses, generally requires the implementation of several successive processing steps (such as polishing, engraving, monitoring, transport, for instance).

The optical lens being produced has to be held and/or positioned with respect to a specific manufacturing machine for each of these processing steps.

This implies the use of numerous tools which are each designed to cooperate on the one hand with the optical lens and on the other hand with a particular manufacturing machine.

SUMMARY OF THE INVENTION

In this context, the invention provides an optical element comprising an optical lens produced by an additive manufacturing method and a holder formed at least in part with the optical lens by said additive manufacturing method, wherein the holder is adapted for cooperation with a manufacturing machine to thereby position the optical lens at a predetermined position in the manufacturing machine.

It is thus taken advantage of the additive manufacturing to produce at least part of the holder integral with the optical lens. Positioning the optical element with respect to the manufacturing machine (possibly by interposing another part of the holder) is greatly simplified as the holder part produced by additive manufacturing may be designed in this purpose.

Additive manufacturing is a manufacturing technique defined in international standard ASTM 2792-12 and designates a process for assembling elements of material to obtain a solid three-dimensional object on the basis of a digital three-dimensional model (typically represented by data of a CAD file, CAS standing for "Computer-Aided Design").

Such a process is sometimes referred to as 3-D printing or material printing because successive elements (e.g. layers) of materials may be deposited in succession one on the precedent. The layers, which correspond to virtual cross sections extracted from the three-dimensional model, are assembled and fused in order to form the solid three-dimensional object, here an optical part comprising an ophthalmic lens and a holder.

The expression "additive manufacturing" especially designates processes that create solid objects by juxtaposing volume elements or voxels with a preset geometry defined by the three-dimensional model (typically in a CAD file as noted above). The term "juxtaposing" is understood to mean sequential operations, for example especially deposition of a layer on the precedent, or the deposition of a voxel making contact with or nearby a voxel deposited beforehand.

Moreover, the term "voxel" is understood to mean an individual element that, in combination with other voxels, defines an intermediate element, a layer for example. The term "voxel" may also apply to an intermediate element, for example a layer, in particular when stereolithography techniques are used.

Thus, depending on the additive manufacturing technique used, the ophthalmic lens will possibly be produced voxel by voxel, line by line or layer by layer.

The additive manufacturing method used may be selected in, but is not limited to, the list consisting of inkjet printing, stereolithography, mask stereolithography or mask projection stereolithography, polymer jetting, scanning laser sintering (SLS), scanning laser melting (SLM,) and fused deposition modeling (FDM).

According to possible embodiments as further explained below, the holder comprises at least two parts connected to each other by a frangible portion.

One of said parts may for instance be designed for cooperation with said manufacturing machine while the other one of said parts may then be designed for cooperation with another manufacturing machine.

In a possible embodiment, the holder may comprise a marking representing a code associated with the optical lens. This marking may thus be used to identify the optical lens during the manufacturing process.

In some examples, as further described below, the holder surrounds the optical lens. This is interesting in particular to reinforce the mechanical structure of the optical element and/or to provide an optical element having a desired outer shape and/or with outer dimensions larger than the dimensions of the optical lens.

In some embodiments, the holder comprises an additional part, the additional part then being adapted to cooperate with the manufacturing machine. The additional part may for instance be an external ring.

The holder may also comprise at least a position reference element.

The holder may also be adapted to orient the optical lens along at least one axis.

The optical lens may for instance be an ophthalmic lens.

As further explained below, the optical lens having an optical center, the holder may be adapted to position the optical center of the optical lens at a predetermined position in the manufacturing machine. In a variant, the holder is adapted to position the geometrical center of the optical lens at a predetermined position in the manufacturing machine or at least an end of the optical lens at a predetermined position in the manufacturing machine.

The invention also provides an assembly comprising an optical element as presented above and said manufacturing machine.

Lastly, the invention provides a method of manufacturing an optical element, comprising producing by additive manufacturing an optical lens and at least part of a holder formed with the optical lens, wherein the holder is adapted for cooperation with a manufacturing machine to thereby position the optical lens at a predetermined position in the manufacturing machine.

This method may further comprise a step of mounting the optical element in the manufacturing machine via said holder, thereby positioning the optical lens at said predetermined position.

As mentioned above, the holder may comprise at least two parts connected to each other by a frangible portion; said method may then comprise a preliminary step of designing each of said parts depending respectively on a manufacturing machine wherewith the concerned part is meant to cooperate.

DETAILED DESCRIPTION OF EXAMPLE(S)

Illustrative embodiments of the present invention are described in detail below with reference to the attached drawing Figures, wherein FIG. 1 shows a first example of an optical element according to the invention;

FIG. 2 schematically shows the optical element of FIG. 1 in a first manufacturing step;

FIG. 3 schematically shows the optical element of FIG. 1 in a second manufacturing step;

FIG. 4 schematically shows the optical element of FIG. 1 in a third manufacturing step;

FIG. 5 shows a second example of an optical element according to the invention;

FIG. 12 shows the optical element of FIG. 8 in a second manufacturing step;

FIG. 13 is a detail view in section of the situation depicted in FIG. 12;

FIG. 14 illustrates a possible additional part meant to be used with the optical element of FIG. 8;

FIG. 15 shows the mounting of the optical element of FIG. 8 to the additional part of FIG. 14;

FIG. 16 shows the mounting of the optical element of FIG. 8 to another additional element; and FIG. 17 schematically shows an exemplary additive manufacturing machine usable to produce an optical element according to the invention.

Figure 6:
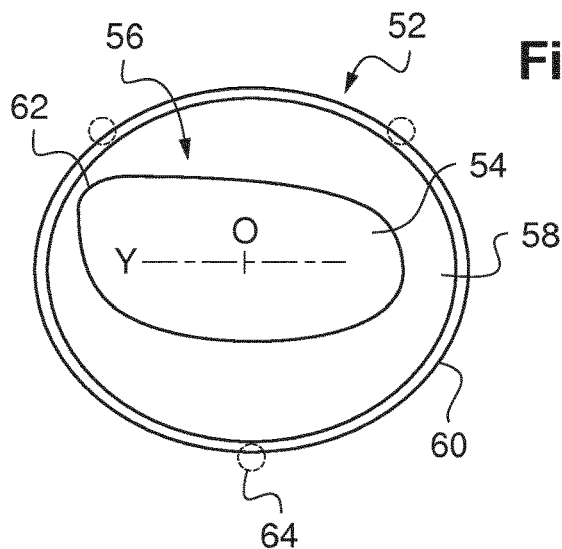
FIG. 6 shows a third example of an optical element according to the invention.

FIG. 1 shows an optical element 2 comprising an optical lens 4 and a holder 6. In the present example, the holder 6 extends from a portion of the edge of the optical element 2.

The optical lens 4 and the holder 6 are both formed by an additive manufacturing method, for instance using an additive manufacturing machine as described below with reference to FIG. 17.

In the present example, the holder 6 is completely produced by the additive manufacturing method. However, as further explained below, the holder may in some embodiments be produced only partly by additive manufacturing. The optical lens 4 is here an ophthalmic lens and therefore has optical surfaces meant to provide a particular correction to a wearer of the ophthalmic lens.

In the present example, the optical element 2 has an outer shape corresponding to the outer shape of the optical lens 4 (and thus to the shape of the rim of a frame meant to carry the optical lens 4) on the biggest part of its periphery.

The holder 6 comprises a plurality of parts 8, 10, 12. Adjacent parts 8, 10, 12 of the holder 6 are connected to each other by a frangible portion 14, 16.

In the example shown in FIG. 1, the holder 6 includes a first part 8, a second part 10 and a third part 12. The first part 8 and the second part 10 are connected by a first frangible portion 14. The second part 10 and the third part 12 are connected by a second frangible portion 16.

The holder 6 may also be connected to the optical lens 4 by a frangible portion 18 (represented by a dotted line in FIG. 1), here a frangible portion 18 connecting the third part 12 and the optical lens 4.

Frangible portions are connecting regions presenting rupture points along a predefined line, possibly by having a reduced thickness (compared to other regions of the holder 4) and/or by being pre-cut (partially) along this line.

Parts 8, 10, 12 of the holder 6 made from the additive manufacturing method (together with the optical lens 4) can be made of the same material as the optical lens 4 or, according to a possible variation, in a material distinct from the material of the optical lens 4 (the possibility to produce several distinct materials by the same additive manufacturing machine is described below with reference to FIG. 17).

The third part 12 of the holder 6 may comprise a marking representing a code associated with the optical lens 6, for instance a code identifying the optical lens 6 in a database (and/or indicating characteristics of the optical lens 6, such as optical characteristics and/or physical characteristics). This marking may be scanned by manufacturing machines during the manufacturing process described below (as long as the third part 12 is not detached from the optical lens 6, as explained below), in particular so as to identify the optical lens 6 being processed by the concerned manufacturing machine.

As shown in FIG. 2, the first part 8 of the holder 6 is designed to cooperate with a first manufacturing machine 20 implementing a first step of the manufacturing process of the optical lens 4.

Precisely, the first part 8 of the holder 6 cooperates with a holding element 22 of the first manufacturing machine 20, for instance so as to position the optical center O of the optical lens 4 at a predetermined position with respect to the first manufacturing machine 20.

The first part 8 of the holder 6 may then be detached from the second part 10 of the holder 6 along the first frangible portion 14. Detaching the first part 8 may for instance enable the second part 10 to become accessible (in particular to be used in the second step of the manufacturing process as described below) and/or reduce the overall volume of the optical element 2 for the further steps of the manufacturing process.

As shown in FIG. 3, the second part 10 of the holder 6 is designed to cooperate with a second manufacturing machine 24 that is distinct from the first manufacturing machine 20 and implements a second step of the manufacturing process.

Precisely, the second part 10 of the holder 6 cooperates with a holding element 26 of the second manufacturing machine 24 so as to position the optical center O at a predetermined position with respect to the second manufacturing machine 24 and/or so as to orient the optical lens 4 along an axis X (as schematically represented in FIG. 3).

In the embodiment shown in FIG. 3, the second manufacturing machine 26 is a monitoring device, for instance a frontofocometer, and the holder 6 (here its second part 10) is designed to orient the optical lens 4 in a predetermined manner with respect to an axis X of the monitoring device, precisely here so that the optical axis of the optical lens 4 is parallel to the axis X of the frontofocometer.

The second part 10 of the holder 6 may then be detached from the third part 12 of the holder 6 along the second frangible portion 16. Detaching the second part 10 may for instance enable the third part 12 to become accessible (in particular to be used in the third step of the manufacturing process as described below) and/or reduce the overall volume of the optical element 2 for the further steps of the manufacturing process.

As shown in FIG. 4, the third part 12 of the holder 6 is designed to cooperate with a third manufacturing machine 28 implementing a third step of the manufacturing process to thereby position the optical lens 4 at a predetermined position in the third manufacturing machine 28.

The third part 12 of the holder 6 may then be detached from the optical lens 4, here by separating the third part 12 and the optical lens 4 along the frangible portion 18.

In the present embodiment, after detaching the last part (here the third part 12) of the holder 6 from the optical lens 4, the outer shape of the optical lens 4 (precisely the edge of the optical lens 4) corresponds to the rim of the frame that is meant to carry the optical lens 4.

The optical lens 4 thus obtained can thus be delivered without any edging step.

Each of the steps of the manufacturing process mentioned above may in practice be one of the following steps: polishing, engraving, monitoring, (hard) coating, tinting, antireflection coating, conveying, packing.

As clear from this list, the manufacturing machine used in each step does not necessarily produce a physical change in the optical lens 4 being processed.

FIG. 5 shows another example of an optical element 32 according to the invention.

The optical element 32 comprises an optical lens 34 and two holders 36, 38. The holders 36, 38 extend for instance from respective portions of the edge of the optical lens 34 which are oppose to each other.

In the present case, the optical lens 34 and the holders 36, 38 are produced by an additive manufacturing method, for instance using an additive manufacturing machine as described below with reference to FIG. 17.

Each holder 36, 38 is designed to cooperate with a manufacturing machine 40, here a machine for polishing or engraving the optical lens 34, in order to position the optical lens 4 at a predetermined position with respect to the manufacturing machine 40.

As visible in FIG. 5, each holder 36, 38 includes a first portion extending mainly along optical surfaces of the optical lens 34 and a second portion extending mainly perpendicular to optical surfaces of the optical lens 34. In the present example, the open end of the second portion of each holder 36, 38 cooperates with the manufacturing machine 40.

As shown in FIG. 5, a support element 42 of the manufacturing machine 40 may be positioned into contact with the optical lens 4 (here with a surface of the optical lens 4 that is opposite a surface to be processed, i.e. here polished or engraved) so as to provide a counter force to support the optical lens 4 while processed by the manufacturing machine 40 (i.e. here during a polishing step or an engraving step).

FIG. 6 shows a further example of an optical element 52 according to the invention.

The optical element 52 comprises an optical lens 54 and a holder 56.

The holder 56 comprises a first part 58 which is produced by an additive manufacturing method together with the optical lens 54, for instance using an additive manufacturing machine as described below with reference to FIG. 17.

The holder 56 also comprises an additional part (here a second part 60) which is mounted to the first part 58 of the holder 56, for instance by snap-fitting.

As visible in FIG. 6, the holder 56 surrounds the optical lens 54 in the present example.

In particular, the first part 58 (produced by the same additive manufacturing method as the optical lens 54) surrounds the optical lens 54 (here along the whole periphery of the optical lens 54).

The optical lens 54 and the holder 56 (precisely the first part 58 of the holder 56) are separated by a frangible portion 62. As visible in FIG. 6, the optical lens 54 (as well as the thin frangible portion 62 surrounding the optical lens 54) is designed to the shape of the rim of the frame meant to carry the optical lens 54 when used to provide a correction to a wearer.

In the present example, the additional part (second part 60) is a ring mounted around the first part 58, e.g. by annular snap-fit.

The first part 58 of the holder 56 thus has an internal edge corresponding to the frangible portion 62 (and thus to the external edge of the optical lens 54) and a circular external edge (having a diameter corresponding to the diameter of the ring 60).

According to a possible embodiment, rings having a diameter comprised in a list of a plurality of possible (fixed) diameters are provided. When an optical lens 54 is to be manufactured, the smallest ring suitable to surround the optical lens 54 is selected and the optical lens 54 is produced by an additive manufacturing method (as explained above) with a first part 58 having an external diameter corresponding to the diameter of the selected ring.

This solution makes it possible to handle optical elements (comprising the optical lens 54 and the holder 56) having a diameter comprised in a limited set of predefined diameters, while limiting the quantity of material used for the first part 58 of the holder 56.

As shown in dotted lines in FIG. 6, the holder 56 may include position reference elements 64 (here three position referenced elements 64). According to a possible embodiment, the position of each of the position reference elements 64 is predefined relative to the optical center O of the optical lens 54 (and also possibly relative to a reference axis Y of the optical lens 54.

Figure 7:
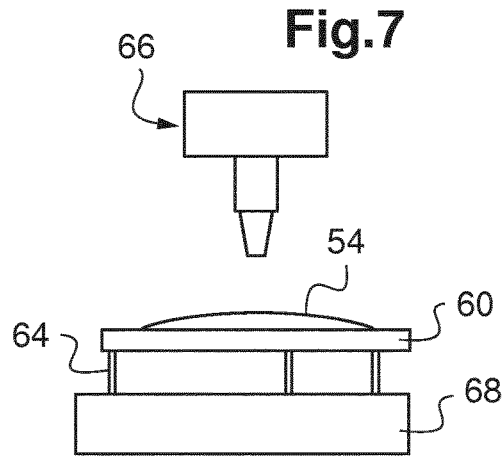
FIG. 7 shows the optical element of FIG. 6 subjected to a test by a monitoring device.

As visible in FIG. 7, the optical element 52 (in particular the optical center O of the optical lens 54 of the optical element 52) can thus be placed at a predetermined position in a manufacturing machine 66 (here a monitoring device such as a frontofocometer) when the position reference elements 64 are placed in cooperation with corresponding elements provided on a holding part 68 of the manufacturing machine 66.

Figure 8:
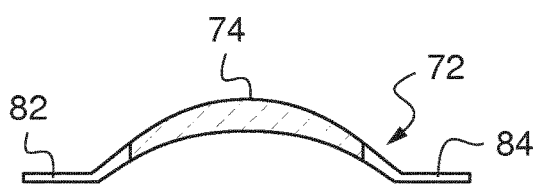
FIG. 8 is a cross section representing a fourth example of an optical element according to the invention.
Figure 9:
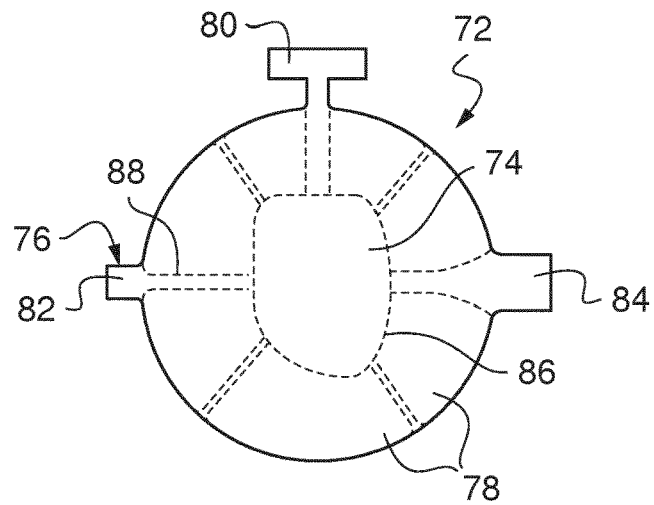
FIG. 9 is a top view of the optical element of FIG. 8.
Figure 10:
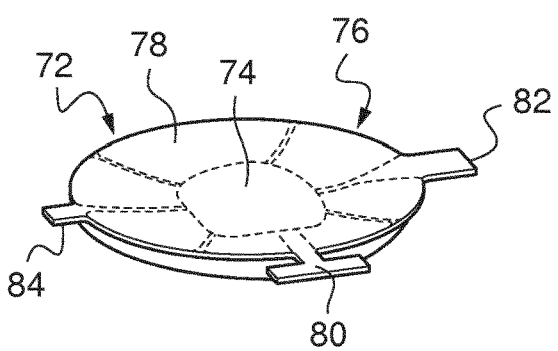
FIG. 10 is a perspective view of the optical element of FIG. 8.

A fourth example of an optical element 72 according to the invention is now described referring to FIGS. 8 to 10.

The optical element 72 comprises an optical lens 74 and a holder 76, both produced by an additive manufacturing method, for instance using an additive manufacturing machine as described below with reference to FIG. 17.

The holder 76 comprising a plurality of parts, including reinforcing parts 78 and indexing parts 80, 82, 84.

These parts 78, 80, 82, 84 extend from the peripheral edge of the optical lens 74. In the present case, the reinforcing and indexing parts 78, 80, 82, 84 extend from all along the periphery of the optical lens 74 such that the holder 76 surrounds the optical lens 74.

As visible in particular in FIG. 9, each of the reinforcing and indexing parts 78, 80, 82, 84 is connected to the optical lens 74 by a frangible portion 86. Each of the reinforcing and indexing parts 78, 80, 82, 84 is also connected to each adjacent part 78, 80, 82, 84 by a frangible portion 88.

In the present example, a first indexing part 80 is connected to a second indexing part 82 via two reinforcing parts 78; the first indexing part 80 is connected to a third indexing part 84 via two reinforcing parts 78; the second indexing part 82 and the third indexing part 84 are connected to each other via three reinforcing parts 78.

In the present example, each reinforcing part 78 extends over the whole area between the optical lens 74 and a circular external edge of the holder 76. However, according to a possible variation, at least one of the reinforcing parts 78 may be designed as a reinforcing arm connecting two parts of the holder 56, e.g. connecting an indexing part 80, 82, 84 to the optical lens 74 or connecting two indexing parts 80, 82, 84 to each other.

As visible in FIG. 9, each indexing part 80, 82, 84 comprises an end region situated opposite the optical lens 74 and protruding beyond the circular external edge of the holder 76.

Each end region is designed to cooperate with a corresponding element of a manufacturing machine so as to position the optical lens in a predetermined position in this manufacturing machine, as further explained below.

Figure 11:
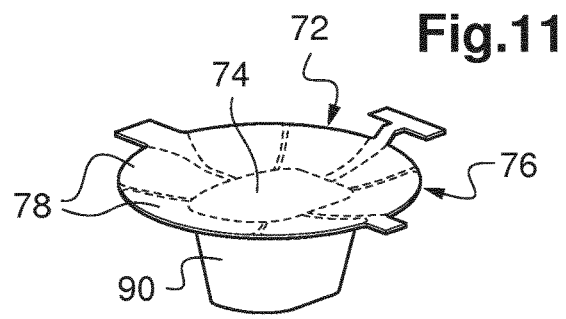
FIG. 11 shows the optical element of FIG. 8 in a first manufacturing step.

FIG. 11 shows the optical element 72 in a first manufacturing step, for instance a polishing step.

The optical element 72 is placed on a supporting element 90, here a supporting element of a polishing machine.

The supporting element 90 contacts the optical element 72 at the level of reinforcing parts 78, in particular. Said differently, one of the reinforcing parts 78 at least is supported by the supporting element 90 and participates therefore in holding the optical element 72 (including the optical lens 74) in the corresponding manufacturing machine (here the polishing machine). The optical lens 74 itself may in addition be supported by the supporting element 90.

Thus, the parts 78, 80, 82, 84 (in particular the reinforcing parts 78) of the holder 76 make it possible for the optical element 72 (including the optical lens 74) to be held (supported) by the supporting element 90 on the whole periphery of the optical element 72, even if the shape of the optical lens 74 does not match the supporting element 90 (in particular: even if the optical lens 74 is smaller than a diameter of the supporting element 90).

Use of the holder 76 surrounding the optical lens 74 enables to use a same supporting element 90 for various optical elements 72 (whatever the shape of the optical lens 74).

Furthermore, the mechanical resistance of the optical element 72 is improved such that the optical lens 74 can undergo the processing step (here the polishing step) without being deformed or broken.

FIG. 12 shows the optical element 72 in a second manufacturing step, for instance a coating step.

In this step, the first indexing part 80 cooperates with a support 92 of a manufacturing machine (here a coating machine) in such a manner that the optical element 72 (including the optical lens 74) is suspended within the manufacturing machine (and can therefore be coated in the present example).

Precisely, in the example described here, the end region of the first indexing part 80 comprises a radial portion 79 extending outwardly beyond the circular external edge of the holder 76 and a transverse portion 81 extending from the radial portion 79 and forming the outer end of the first indexing part 80.

The support 92 of the manufacturing machine comprises a longitudinal groove 91 (having a width larger than the width of the radial portion 79 but smaller than the lateral extent of the transverse portion 81) and a plurality of pairs of slots 93 (each having a width slightly larger than the thickness of the first indexing part 80).

As visible in FIG. 13, the optical element 72 can be suspended on the support 92 by engaging the transverse portion 81 into a given pair of slots 93 such that part of the transverse portion 81 lies on the support 92 and the radial portion 79 extends across the longitudinal groove 91.

As the transverse portion 81 has a fixed position in the concerned pair of slots 93, the optical element 72 (as well as the optical lens 74 comprised in the optical element 72) is positioned at a predetermined position in the manufacturing machine.

FIG. 14 depicts a ring 94 used as a support in a manufacturing machine used in a third manufacturing step as now explained.

FIG. 15 shows the optical element in this third manufacturing step, here engraving.

As visible in FIG. 15, reinforcing parts 78 of the holder 76 have been detached from the optical element 72 (along frangible portions 88) between the previous step (second manufacturing step) and the current step (third manufacturing step).

Indexing parts 80, 82, 84 of the holder 76 however remain connected to the optical lens 74 (via residual parts of the frangible portions 86).

The ring 94 provided in the manufacturing machine (here an engraving machine) includes a plurality of recesses 95 each corresponding with one of the indexing parts 80, 82 84 of the holder 76, as visible in FIG. 15. Each recess 95 is adapted to receive the corresponding indexing part 80, 82, 84 and engage with it such that the optical lens 74 is positioned at a predetermined position in the manufacturing machine (here the engraving machine) when each of the plurality of indexing parts 80, 82, 84 cooperates with the corresponding recess 95.

As visible in particular in FIGS. 8 and 15, the optical element 72 is not planar but curved. To the opposite, each indexing part 80, 82, 84 has an extension that is slanted with respect to the optical axis of the optical lens 74 such that the optical lens 74 at a distance from the ring 92 when the indexing parts 80, 82, 84 are mounted in the corresponding recesses 95.

The optical lens 74 is thus positioned above the ring 94 and is accessible for the engraving machine to be processed in this engraving step.

Designing the indexing parts 80, 82, 84 to cooperate with the ring 94 (in particular with the recesses 95 of the ring 94) makes it possible to use a standard ring for various optical elements (although each optical element may include an optical lens having a specific shape).

FIG. 16 shows the optical element 72 in a fourth manufacturing step, here antireflection coating.

A support 96 used in this fourth manufacturing step includes a plurality of slots 98 respectively corresponding to a portion at least of the indexing parts 80, 82, 84 of the holder 76.

Precisely, in the present case, one of the slots corresponds to the radial portion 79 of the first indexing part 80 while two other slots respectively correspond to the second and third indexing parts 82, 84 of the holder 76.

As in previous steps, the optical lens 74 is positioned at a predetermined position in the manufacturing machine (here the reflection coating machine) when the indexing parts 80, 82 84 of the holder 76 are placed in the respective slots 98.

In the present example, the support 96 is ring-shaped and therefore defines a cavity 99 (surrounded by a wall wherein the slots 98 are formed).

In view of the curved shape of the optical element 72 (and in particular of the slanted orientation of the indexing parts 80, 82, 84 with respect to the optical axis of the optical lens 74), the optical lens 74 lies in the present example in the cavity 99.

Thanks to the support 96 (having for instance a standard circular outer shape), the optical element 72 can be easily positioned at a desired position in the antireflection coating machine (without having to take into account the shape of the optical lens 74 included in the optical element 72).

FIG. 17 shows an exemplary additive manufacturing machine 101 usable in the context of the present invention.

This additive manufacturing machine 101 comprises a control unit 102, a nozzle 113 (or possibly a bank of such nozzles) and a manufacturing supporting member 112 on which an optical element 110 will be manufactured by means of an additive manufacturing method.

The additive manufacturing machine 101 also comprises an aperture 106, here covered during the manufacturing phase by a removable shield, thereby allowing the optical element 110 to be reached on the manufacturing supporting member 112 after manufacture by means of the additive manufacturing method.

The manufacturing supporting member 112 comprises a body provided with a manufacturing surface that has an overall geometry, all or some of which is independent or dependent on the geometry of at least one surface of the object to be produced by additive manufacturing. In the example described here, the manufacturing surface is flat; as a variant, it could for example be convex or concave.

The nozzle 113 (or the nozzles in the bank of nozzles) is (are each) controlled by the control unit 102 so as to be moved by actuators and to deliver elementary volumes (or voxels) of a material that will form, after an optional additional treatment (such as a photo-polymerization step), elementary portions of the optical element 110.

The control unit 102 is provided with a data processing system, especially comprising a microprocessor 103 and a (e.g. non-volatile) memory 104 (here a read-only memory or ROM integrated into the microprocessor 103). Such a memory 104 stores computer program instructions (forming a software) which, when executed by the microprocessor 103, allows the additive manufacturing machine 101 to be controlled and thus the additive manufacturing method to be implemented, for example in order to produce one of the optical elements described above.

The control unit 102 furthermore comprises a modifiable memory 105, here a volatile random access memory (RAM), in which the data used during the execution of the software and implementation of the additive manufacturing method are stored.

As a variant, the non-volatile memory 104 and/or the modifiable memory 105 could be a rewritable non-volatile memory, for example an electrically erasable programmable read-only memory (EEPROM).

The modifiable memory 105 especially stores elements for defining the optical element 110 to be manufactured. These defining elements were for example received beforehand from another data-processing system (not shown) connected to the manufacturing machine 101 by means of a computer network.

These defining elements are for example data (typically taking the form of a file stored in the modifiable memory 105) that at least partly define the (three-dimensional) geometry of the optical element 110.

The defining elements may also include data that define the simple optical function prescribed to the optical (here ophthalmic) lens included in the optical element to be manufactured, as described below. According to one possible embodiment, the defining elements may comprise personalizing parameters of the future wearer of spectacles equipped with this optical lens and/or parameters of the geometry of the frame that will bear this optical lens.

Specifically, the geometry of the optical lens included in the optical element 110 may be deduced from defining elements representing knowledge of the optical function and optionally of personalizing and/or frame parameters. The defining elements may thus include a definition of the shape of the edge of the optical lens included in the optical element 110.

The expression "optical function of an optical lens" is understood to mean the optical response of this lens, i.e. a function defining any modification of the propagation and transmission of an optical beam through the lens in question, whatever the incidence of the entering optical beam and whatever the geometric extent of the entrance dioptre illuminated by the incident optical beam.

More precisely, in the ophthalmic field, optical function is defined as the distribution of wearer power and astigmatism characteristics, of prismatic deviations and higher-order aberrations associated with the lens for all the directions of the gaze of a wearer of this lens. Of course, this assumes that the geometric position of the lens relative to the eye of the wearer is already known.

It will also be noted that wearer power is one way of calculating and adjusting the power of the ophthalmic lens, another way being to use lensmeter power. Calculation of wearer power ensures that the power perceived by the wearer (i.e. the power of the beam of light that enters into the eye), once the lens has been fitted in the frame and is being worn by the wearer, corresponds to the prescribed power. At the optical centre of a unifocal lens, wearer power is generally close to the power observed with a lensmeter positioned at this point.

The modifiable memory 105 (or as a variant the read-only memory 104) for example furthermore stores characteristics of materials that may be formed (e.g. after photo-polymerization) from materials delivered by the nozzle 113 (or the bank of nozzles). These characteristics may optionally be taken into account when the geometry of the portions to be manufactured is determined (by the microprocessor 103).

Likewise, the modifiable memory 105 (or as a variant the non-volatile memory 104) may store data defining the manufacturing area of the manufacturing supporting member 112, in particular when this surface is not flat (for example concave or convex as indicated above), and/or other data representing characteristic parameters of the additive manufacturing, for example the rate of advance of the nozzle(s) 113, the power and power source implemented in the subsequent treatment (e.g. the photo-polymerization), for example a source emitting in the ultraviolet (or, as a variant, a laser such as in the case of a stereolithography machine, or heating power in the case of deposition of a tensioned filament or extrusion of a thermoplastic filament).

Producing the optical element 110 by additive manufacturing may include, in addition to forming a plurality of superimposed voxels or layers, one or several step(s) of photo-polymerization. Steps of photo-polymerization may be performed when producing each voxel, or globally after delivery of material by the nozzle 113 (or the bank of nozzles), or after depositing each layer of material.

It may be furthermore noted that polymerization of the optical element 110 may be unfinished at the end of the additive manufacturing method producing optical element 110.

According to a possible embodiment, the additive manufacturing machine may include a plurality of nozzles, each nozzle delivering a particular composition or material. Use of a plurality of nozzles makes it possible to obtain a functionally graded material (FGM) having a composition gradually varying over space.

According to possible embodiments:

the plurality of juxtaposed and superposed voxels (or volume elements) forms superposed layers that each have a thickness that is constant or variable over their length and/or all have or do not have the same thickness;

the material is a photopolymer comprising one or more families of molecules having one or more acrylic, methacrylic, acrylate or methacrylate functions; a family of molecules having one or more epoxy, thioepoxy or thiolene functions; a family of molecules having one or more thiol, sulfide or episulfide functions; a family of molecules having one or more vinyl ether, vinyl caprolactam or vinylpyrolidone functions; a family of hyperbranched or hybrid organic/inorganic materials; or a combination of these functions; the mentioned chemical functions possibly being carried by monomers or oligomers or a combination of monomers and oligomers;

the material may comprise at least one photoinitiator;

the material may comprise colloidal particles or nanoparticles, in particular colloidal particles or nanoparticles having dimensions for example smaller than the visible wavelengths, such as for example:

nanoparticles of carbonates of alkaline-earth metals such as calcium carbonate for example;

nanoparticles of sulfates of alkaline-earth metals such as barium sulfate for example;

nanoparticles of metal oxides, such as alumina, zinc oxide, zirconium oxide or titanium dioxide for example;

nanoparticles of metalloid oxides, silica dioxide for example;

nanoparticles of metal sulfides, especially zinc sulfide;

siloxanes, such as the silsesquioxanes for example; and nanoparticles functionalizable with polymerizable organic groups, incorporating such nanoparticles in a monomer especially allowing the index of the latter to be increased;

the material may comprise, in at least certain of the preset volume elements, a pigment or dye, for example a dye belonging to the azo or rhodamine or cyanine or polymethine or merocyanine or fluorescein or pyrylium or phthalocyanine or perylene or benzanthrone or anthrapyrimidine or anthrapyridone families, or even a metal-complex dye such as a rare-earth cryptates or chelates; incorporating such materials into the initial monomer formulation especially allowing tinted lenses or even lenses with a gradient tint to be obtained;

the manufacturing process comprises an additional thermal irradiation step and/or an additional actinic irradiation step, such as for example at ultraviolet wavelengths of the spectrum, or even no irradiation step;

the manufacturing process may comprises a step in which the index variation of the material of the ophthalmic lens is taken into account, taking the form of an iterative optimization loop according to known optimization procedures;

the material of the ophthalmic lens optionally comprises one or more dyes, and/or nanoparticles configured to modify its optical transmission and/or its appearance, and/or nanoparticles or additives configured to modify its mechanical properties;

the additive manufacturing machine is not a three-dimensional printing machine but rather a stereolithography machine (or SLA for "Stereolithograpy Apparatus") or a thermoplastic filament extrusion machine, also called a tensioned filament deposition machine (or FDM for "Fused Deposition Modeling"); and the control unit comprises a microcontroller instead of a microprocessor.

It is to be noted that, further than being adapted to cooperate with a manufacturing machine which is not the additive manufacturing machine, the holder of the invention may also be of use within the additive manufacturing machine, during a step of additively manufacturing the optical element. Accordingly the holder may serve as a holder even during the additive manufacturing of the optical element. It may for example be of use to support or stabilize part of the optical element while it is additively manufactured.

In non-limiting examples, the holder of FIG. 1, and the optical element joined to it, may be formed with the optical element being built vertically, i.e. with a direction of construction within the plane of the image of FIG. 1, by additive manufacturing. In that case the orientation of the optical element and the holder are advantageously chosen so that the holder helps support the optical element. For example the manufacturing instructions may be determined so that the assembly, made of the optical element and the holder, rests in contact with the additive manufacturing machine based on at least one point of the optical element and at least one point of the holder.

Alternatively, the holder of FIG. 6 may have a part of it that helps support the sides of the optical element 54 during the manufacturing step if the direction of manufacturing of the additive manufacturing step is oriented sensibly perpendicularly to the plan formed by the ring 60. Such support would thus have a section similar to the section shown in FIG. 8 (the optical element referenced 74 in FIG. 8 would then represent the optical element 54 of FIG. 6, and the parts 82 and 84 would then represent part of the holder 58 and of the ring 60 in a cut view in a plan perpendicular to the axis OY of FIG. 6), although FIG. 8 is directed to another embodiment described above in conjunction with FIGS. 9, 10 and 11. Such use of the holder may alternatively be obtained even if the shape of the holder is different from a ring.

Further it is to be noted that when an optical element is additively manufactured along a vertical axis, i.e. with a reference plane of the optical element defined using the edges of the optical element being vertical or close to vertical, there is a high risk for the optical element to topple during the manufacturing process since its center of mass is not between the traces of the part of the assembly which is in contact with the additive manufacturing machine. Indeed, optical elements such as lenses have a convex side and/or a concave side and thus have a gravity center with is off-balanced from the reference plane mentioned above. If the lens is built vertically by additive manufacturing, the position of the center of mass moves along the horizontal plane, perpendicularly to the reference plane, during the additive manufacturing step. Accordingly, when an optical element is built vertically on one of its edges, with a part of one of the edges of the optical element being used as starting layer for the manufacturing, as the manufacturing advances, the center of mass is displaced away from said starting layer and often is not anymore vertically above said starting layer, or a trace zone delimited by said starting layer. Accordingly, the assembly may ends unbalanced and may topple or swing during manufacturing.

However, the usual solution of the additive manufacturing technical domain for preventing a manufactured object from falling or toppling is un-desirable for manufacturing optical elements. Indeed, it is preferable not to build any supporting structuring directly in contact with the optical surface of the lens due to its impact on roughness quality and thus on optical quality.

According to an embodiment of the invention, the holder of the invention may be designed to take into account and compensate for this unbalance of the optical element during the manufacturing, preventing it from toppling. Accordingly the holder may be designed to have a larger thickness in the part destined to be attached to the additive manufacturing machine, extending from the reference plane or the edges of the optical element or the edges of the holder toward the direction of the planned center of mass. Thus, it is possible to ensure that part of the holder reaches farther than the center of mass and acts as a supporting structure so as to position said the center of mass above a zone delimited by a footprint of the manufactured assembly composed of the holder and of the optical element. Effects of a supporting structure are thus obtained while it being attached, through the holder, only to the edges of the optical element. Further said thickness may decrease in thickness in the upper parts of the holder.

The invention claimed is:

1. An optical element comprising:
    an optical lens produced by an additive manufacturing method; and
    a holder formed at least in part with the optical lens by said additive manufacturing method, the holder being configured to cooperate with a manufacturing machine to thereby position the optical lens at a predetermined position in the manufacturing machine, the holder comprising at least two parts connected to each other by a frangible portion.

2. The optical element according to claim 1, wherein one of said parts is configured to cooperate with said manufacturing machine and the other one of said parts is configured to cooperate with another manufacturing machine.

3. The optical element according to claim 1, wherein the holder further comprises a marking representing a code associated with the optical lens.

4. The optical element according to claim 3, wherein the holder surrounds the optical lens.

5. The optical element according to claim 1, wherein the holder further comprises an additional part, the additional part being configured to cooperate with the manufacturing machine.

6. The optical element according to claim 5, wherein the additional part is an external ring.

7. The optical element according to claim 1, wherein the holder further comprises at least a position reference element.

8. The optical element according to claim 1, wherein the holder is configured to orient the optical lens along at least one axis.

9. The optical element according to claim 1, wherein the optical lens is an ophthalmic lens.

10. The optical element according to claim 1, wherein the optical lens has an optical center, and
    wherein the holder is configured to position the optical center of the optical lens at a predetermined position in the manufacturing machine.

11. An assembly comprising:
    the optical element according to claim 1; and
    said manufacturing machine.

12. A method of manufacturing an optical element, the method comprising:
    producing, by additive manufacturing, an optical lens and at least part of a holder formed with the optical lens, the holder being configured to cooperate with at least one manufacturing machine to thereby position the optical lens at a predetermined position in the at least one manufacturing machine, the holder comprising at least two parts connected to each other by a frangible portion.

13. The method according to claim 12, further comprising mounting the optical element in the at least one manufacturing machine via said holder, thereby positioning the optical lens at said predetermined position.

14. The method according to claim 12, further comprising a preliminary step of designing each of said parts depending respectively on the at least one manufacturing machine with which each of the parts is configured to cooperate.

15. The optical element according to claim 2, wherein the holder further comprises a marking representing a code associated with the optical lens.

16. The optical element according to claim 2, wherein the holder further comprises an additional part, the additional part being configured to cooperate with the manufacturing machine.

17. The optical element according to claim 3, wherein the holder further comprises an additional part, the additional part being configured to cooperate with the manufacturing machine.

* * * * *